US009633015B2

(12) United States Patent
Arngren et al.

(10) Patent No.: US 9,633,015 B2
(45) Date of Patent: Apr. 25, 2017

(54) APPARATUS AND METHODS FOR USER GENERATED CONTENT INDEXING

(75) Inventors: Tommy Arngren, Sodra Sunderbyn (SE); David Lindegren, Lulea (SE); Joakim Söderberg, Solna (SE); Marika Stålnacke, Lulea (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 126 days.

(21) Appl. No.: 13/559,258

(22) Filed: Jul. 26, 2012

(65) Prior Publication Data
US 2014/0032562 A1 Jan. 30, 2014

(51) Int. Cl.
G06F 17/30 (2006.01)

(52) U.S. Cl.
CPC .... *G06F 17/3002* (2013.01); *G06F 17/30312* (2013.01); *G06F 17/30619* (2013.01)

(58) Field of Classification Search
CPC ......... G06F 17/30321; G06F 17/30312; G06F 17/30619
USPC .................................. 707/741, 913
See application file for complete search history.

(56) References Cited

U.S. PATENT DOCUMENTS

| 5,678,040 | A |   | 10/1997 | Vasudevan et al. |
|-----------|---|---|---------|------------------|
| 5,832,495 | A |   | 11/1998 | Gustman |
| 5,963,940 | A | * | 10/1999 | Liddy ............... G06F 17/30654 |
| 6,026,388 | A | * | 2/2000  | Liddy ............... G06F 17/30654 |
| 6,363,380 | B1 |  | 3/2002  | Dimitrova |
| 6,374,260 | B1 |  | 4/2002  | Hoffert |
| 6,484,156 | B1 |  | 11/2002 | Gupta et al. |
| 6,643,643 | B1 |  | 11/2003 | Lee et al. |
| 7,131,059 | B2 | * | 10/2006 | Obrador ............ G06F 17/30056 707/E17.028 |

(Continued)

FOREIGN PATENT DOCUMENTS

| EP | 1 024 437 A2 | 8/2000 |
| EP | 1 220 541 A2 | 7/2002 |

(Continued)

OTHER PUBLICATIONS

National Phase of PCT/SE2014/050027, U.S. Appl. No. 14/915,408, filed Feb. 29, 2016.

(Continued)

Primary Examiner — Shahid Alam
Assistant Examiner — Nargis Sultana
(74) Attorney, Agent, or Firm — Rothwell, Figg, Ernst & Manbeck, P.C.

(57) ABSTRACT

A method and client device is disclosed for indexing content of a multimedia file. The method comprises using a client device to segment the content of the multimedia file into a plurality of segments and to determine structure-searchable data for each segment. Determining structure searchable data for a segment comprises (1) identifying one or more features of respective multimedia types in the segment; (2) correlating each of the identified features to one or more respective keywords; and (3) calculating one or more respective relevance factors for each of the keywords, where at least one of the relevance factors is based on one or more characteristics of the client device. The method also comprises the client device transmitting the structure-searchable data (including the keywords, relevance factors, and respective media types of the identified features) to an indexing server.

34 Claims, 10 Drawing Sheets

(56) References Cited

U.S. PATENT DOCUMENTS

| | | | |
|---|---|---|---|
| 7,149,359 B1* | 12/2006 | Omoigui | G06F 17/3079 382/219 |
| 7,493,312 B2 | 2/2009 | Liu et al. | |
| 7,627,556 B2 | 12/2009 | Liu et al. | |
| 8,060,906 B2 | 11/2011 | Begeja et al. | |
| 8,065,301 B2 | 11/2011 | Ginsburg et al. | |
| 8,166,029 B2 | 4/2012 | Park et al. | |
| 8,438,157 B2* | 5/2013 | Adams, Jr. | G06F 17/30064 707/725 |
| 8,566,370 B2 | 10/2013 | Jin et al. | |
| 9,292,552 B2 | 3/2016 | Arngren et al. | |
| 2001/0047379 A1* | 11/2001 | Jun | G06F 17/30244 718/1 |
| 2002/0054083 A1* | 5/2002 | Boreczky | G06F 3/0481 715/738 |
| 2002/0161747 A1 | 10/2002 | Li et al. | |
| 2003/0033347 A1 | 2/2003 | Bolle et al. | |
| 2003/0105589 A1 | 6/2003 | Liu et al. | |
| 2003/0107592 A1 | 6/2003 | Li et al. | |
| 2003/0108334 A1 | 6/2003 | Nevenka et al. | |
| 2004/0025180 A1 | 2/2004 | Begeja et al. | |
| 2004/0111432 A1 | 6/2004 | Adams, Jr. et al. | |
| 2004/0162870 A1* | 8/2004 | Matsuzaki | G06F 21/10 709/200 |
| 2004/0215663 A1 | 10/2004 | Liu et al. | |
| 2004/0220925 A1 | 11/2004 | Liu et al. | |
| 2005/0102312 A1* | 5/2005 | Ohya | G06F 21/6245 |
| 2005/0222981 A1 | 10/2005 | Lawrence et al. | |
| 2006/0122984 A1 | 6/2006 | Byers et al. | |
| 2006/0149624 A1* | 7/2006 | Baluja | G06Q 30/0255 705/14.53 |
| 2006/0218191 A1* | 9/2006 | Gopalakrishnan | G06F 17/3002 |
| 2006/0282336 A1* | 12/2006 | Huang | G06F 17/30864 705/26.61 |
| 2007/0033515 A1 | 2/2007 | Sull et al. | |
| 2007/0067304 A1 | 3/2007 | Ives | |
| 2007/0106646 A1 | 5/2007 | Stern et al. | |
| 2007/0106660 A1 | 5/2007 | Stern et al. | |
| 2007/0220025 A1* | 9/2007 | Hyman | G06F 17/30035 |
| 2008/0016101 A1 | 1/2008 | Ginsburg et al. | |
| 2008/0016293 A1* | 1/2008 | Saika | G06F 3/0605 711/154 |
| 2008/0112690 A1* | 5/2008 | Shahraray | H04N 5/44543 386/262 |
| 2008/0124055 A1* | 5/2008 | Shahraray | G06F 17/30849 386/241 |
| 2008/0232775 A1* | 9/2008 | Ljolje | G06F 17/30787 386/329 |
| 2008/0310628 A1* | 12/2008 | Fujioka | G06F 11/1469 380/201 |
| 2009/0006368 A1 | 1/2009 | Mei et al. | |
| 2009/0041356 A1 | 2/2009 | Barbieri et al. | |
| 2009/0110296 A1 | 4/2009 | Sekiguchi et al. | |
| 2009/0116645 A1 | 5/2009 | Jeong et al. | |
| 2009/0138472 A1 | 5/2009 | MacLean | |
| 2009/0210779 A1 | 8/2009 | Badoiu et al. | |
| 2009/0240674 A1 | 9/2009 | Wilde | |
| 2009/0300351 A1 | 12/2009 | Lei et al. | |
| 2010/0005121 A1 | 1/2010 | Benitez et al. | |
| 2010/0070485 A1* | 3/2010 | Parsons | G06F 17/30864 707/709 |
| 2010/0094630 A1 | 4/2010 | Yoakum | |
| 2010/0138292 A1* | 6/2010 | Park | G06F 17/30997 705/14.46 |
| 2010/0158470 A1* | 6/2010 | Tzoukermann | G06F 17/30038 386/241 |
| 2010/0161580 A1* | 6/2010 | Chipman | G06F 17/3053 707/706 |
| 2011/0010372 A1 | 1/2011 | Sahasrabudhe et al. | |
| 2011/0047163 A1 | 2/2011 | Chechik et al. | |
| 2011/0072012 A1 | 3/2011 | Ah-Pine et al. | |
| 2011/0208722 A1 | 8/2011 | Hannuksela | |
| 2011/0249956 A1* | 10/2011 | Komai | H04N 5/147 386/248 |
| 2012/0023084 A1* | 1/2012 | Lalji | G06F 17/3002 707/706 |
| 2012/0089580 A1* | 4/2012 | Yamashita | G06F 17/30345 707/695 |
| 2012/0110080 A1* | 5/2012 | Panyam | G06Q 50/01 709/204 |
| 2012/0124055 A1* | 5/2012 | Deubel | G06F 17/30722 707/741 |
| 2012/0158713 A1 | 6/2012 | Jin et al. | |
| 2013/0151534 A1 | 6/2013 | Luks et al. | |
| 2013/0166587 A1 | 6/2013 | Berry | |
| 2013/0219024 A1* | 8/2013 | Flack | H04L 67/2804 709/219 |
| 2013/0226930 A1 | 8/2013 | Arngren et al. | |
| 2013/0282687 A1 | 10/2013 | Ah-Pine et al. | |
| 2014/0032538 A1 | 1/2014 | Arngren et al. | |
| 2016/0085860 A1 | 3/2016 | Wallenberg et al. | |

FOREIGN PATENT DOCUMENTS

| | | |
|---|---|---|
| EP | 1 480 100 A1 | 11/2004 |
| EP | 2216731 A2 | 8/2010 |
| WO | 01/17163 A1 | 3/2001 |
| WO | 02/084980 A1 | 10/2002 |
| WO | 2012/001216 A1 | 1/2012 |
| WO | 2015/030645 A1 | 3/2015 |
| WO | 2015/030646 A1 | 3/2015 |

OTHER PUBLICATIONS

International Search Report and Written Opinion of the ISA issued for International Patent Application No. PCT/SE2014/050027 dated Nov. 3, 2014, 10 pages.

Lew, M.S., et al. "Content-Based Multimedia Information Retrieval: State of the Art and Challenges.", ACM Transactions on Multimedia Computing, Communications and Applications, vol. 2, No. 1, Feb. 2006, pp. 1-19.

"MPEG-7 Overview", International Organisation for Standardisation, ISO/IEC JTC1/SC29/WG11, Coding of Moving Pictures and Audio, Oct. 2004, pp. 1-95.

Non-Final Office Action for U.S. Appl. No. 13/688,566, mailed Sep. 10, 2014, 10 pages.

Non-Final Office Action for U.S. Appl. No. 13/688,566, mailed Mar. 12, 2015, 11 pages.

Final Office Action for U.S. Appl. No. 13/688,566, mailed Sep. 10, 2015, 16 pages.

Examiner-Initiated Interview Summary for U.S. Appl. No. 13/688,566 of Nov. 16, 2015, 1 page.

Notice of Allowance for U.S. Appl. No. 13/688,566, mailed Dec. 30, 2015, 19 pages.

Non-Final Office Action for U.S. Appl. No. 13/408,448 mailed Feb. 6, 2013, 15 pages.

Non-Final Office Action for U.S. Appl. No. 13/408,448 mailed Jun. 14, 2013, 19 pages.

Final Office Action for U.S. Appl. No. 13/408,448 mailed Dec. 5, 2013, 21 pages.

Non-Final Office Action for U.S. Appl. No. 13/408,448 mailed Apr. 7, 2014, 21 pages.

Final Office Action for U.S. Appl. No. 13/408,448 mailed Aug. 29, 2014, 28 pages.

Advisory Action for U.S. Appl. No. 13/408,448 mailed Nov. 7, 2014, 3 pages.

Weisstein, Eric W. "Probability Axioms." From MathWorld—A Wolfram Web Resource. http://mathworld.wolfram.com/ProbabilityAxioms.html, 1 page.

Examiner's Answer to Appeal Brief for U.S. Appl. No. 13/408,448 mailed May 18, 2015, 10 pages.

International Search Report and Written Opinion of the ISA issued for International Patent Application No. PCT/SE2013/050536, mailed Apr. 10, 2014, 17 pages.

Lawto et al., "A Scalable Video Search Engine Based on Audio Content Indexing and Topic Segmentation," Turin, Italy, Sep. 2011,

(56) References Cited

OTHER PUBLICATIONS http://hal.archivesouvertes.fr/docs/00/64/52/28/PDF/NEMSummit2011_final2.pdf [retrieved on Apr. 2, 2014], 6 pages.

Yang, W. et al., "Discriminative Tag Learning on YouTube Videos with Latent Sub-tags," in proceeding of The 24th IEEE Conference on Computer Vision and Pattern Recognition, CVPR 2011, Colorado Springs, CO, USA, Jun. 20-25, 2011, pp. 3217-3224.

Garcia, E., "The Term Count Model: Demystifying Term Vector Calculations," Oct. 27, 2006, 7 pages, http://web.archive.org/web/20121029050356/http://www.miislita.com/term-vector/term-vector-2.html.

National Phase of PCT/SE2014/050240, U.S. Appl. No. 14/914,849, filed Feb. 26, 2016.

International Search Report and Written Opinion of the ISA issued for International Patent Application No. PCT/SE2014/050240, mailed Dec. 8, 2014, 14 pages.

Cisco Systems, Inc., "Cisco Visual Networking Index: Forecast and Methodology, 2012-2017," Cisco White Paper, May 29, 2013, 15 pages.

Cisco Systems, Inc., "Press Release: Cisco Global Cloud Index Forecasts Cloud Traffic to Grow Sixfold by 2016," retrieved Jul. 8, 2014, dated Oct. 23, 2012, 5 pages.

Cisco Systems, Inc., Cisco Visual Networking Index: Global Mobile Data Traffic Forecast Update, 2012-2017, Cisco White Paper, Feb. 6, 2013, 34 pages.

www.google.com print screen of "Obama" search results, Aug. 16, 2013, 3 pages.

Extended European Search Report for European Patent Application No. 14839431.5, dated Jul. 22, 2016.

Non-Final Office Action issued in U.S. Appl. No. 13/408,448, dated Feb. 9, 2017, 24 pages.

\* cited by examiner

| File | Date | Loc. | UID | DevID | Seq. | Keyword | Img | Text | Sound | Voice | From | WRel | WFact | Score |
|---|---|---|---|---|---|---|---|---|---|---|---|---|---|---|
| F | D | L | 1 | myPhone | 1 | Lisa | x | | | x | 10 | 1 | 1.5 | |
| F | D | L | 1 | myPhone | 2 | Olle | x | | | | 5 | 1 | 1.5 | |
| F | D | L | 1 | myPhone | 2 | Lisa | | x | | x | 4 | .5 | 1.3 | |
| F | D | L | 1 | myPhone | 3 | ICA | x | | | | 4 | .3 | 1.2 | |
| F | D | L | 1 | myPhone | 3 | Banana | x | | | | 7 | .6 | 1.4 | |
| F | D | L | 1 | myPhone | 3 | Jerry | x | | | x | 5 | .2 | 1.2 | |
| F | D | L | 1 | myPhone | 4 | Ball | x | | | | 1 | .4 | 1 | |

↙ SSD table 500

*FIG. 5*

SSD table 700

| File | Date | Loc. | UID | DevID | Seq. | Keyword | Img | Text | Sound | Voice | Prom | WRel | WFact | Score |
|---|---|---|---|---|---|---|---|---|---|---|---|---|---|---|
| F | D | L | 1 | myPhone | 1 | Lisa | x | | | x | 10 | 1 | 1.5 | 33.0 |
| F | D | L | 1 | myPhone | 2 | Olle | x | | | | 5 | 1 | 1.5 | 22.5 |
| F | D | L | 1 | myPhone | 2 | Lisa | | x | | x | 4 | .5 | 1.3 | 7.2 |
| F | D | L | 1 | myPhone | 3 | ICA | x | | | | 4 | .3 | 1.2 | 5.0 |
| F | D | L | 1 | myPhone | 3 | Banana | x | | | | 7 | .6 | 1.4 | 12.6 |
| F | D | L | 1 | myPhone | 3 | Jerry | x | | | x | 5 | .2 | 1.2 | 4.6 |
| F | D | L | 1 | myPhone | 4 | Ball | x | | | | 1 | .4 | 1 | 4.4 |

Index 720

| Score | Keyword | File | Seq. |
|---|---|---|---|
| 33 | Lisa | F | 1 |
| 22.5 | Olle | F | 2 |
| 7.2 | Lisa | F | 2 |
| 5 | ICA | F | 3 |
| 12.6 | Banana | F | 3 |
| 4.6 | Jerry | F | 3 |
| 4.4 | Ball | F | 4 |

Weight table 710

| GroupID | Media Type | Weight |
|---|---|---|
| 6 | Image | 10 |
| 6 | Text | 5 |
| 6 | Sound | 3 |
| 6 | Voice | 2 |

FIG. 7

APPARATUS AND METHODS FOR USER GENERATED CONTENT INDEXING

TECHNICAL FIELD

Embodiments relate generally to digital search techniques and more specifically, to indexing of multimedia content.

BACKGROUND

As the available amount of multimedia content grows, so does the need for effective search and retrieval systems. Search and retrieval systems ("search engines") typically operate by receiving (e.g., from a user) a textual query of terms and/or phrases. The search engine compares the search terms ("keywords") against a body of searchable content and returns an indication of the most relevant items in that content. The classic example of a search engine is an Internet search engine that uses user-provided keywords to find relevant web pages and returns a listing of the most relevant ones.

As the amount of digital data increases, search engines are being deployed not only for Internet search, but also for proprietary, personal, or special-purpose databases, such as personal multimedia archives, user generated content sites, proprietary data stores, workplace databases, and others. For example, personal computers may host search engines to find content on the entire computer or in special-purpose archives (e.g., personal music or video collection). User generated content sites, which host multimedia and/or other types of content, may provide custom search functionality tailored to that type of content.

To facilitate efficient search and retrieval, search engines typically pre-process content by creating indices. Once created, indices allow a search engine to map search terms to relevant content without need to rescan all of the content on each search. Therefore, the quality of search results is heavily dependent on the quality of the index generated. Accordingly, more effective techniques for generating accurate search indices are needed.

SUMMARY

A method is disclosed for indexing content of a multimedia file. The method comprises using a client device to segment the content of the multimedia file into a plurality of segments and to determine structure-searchable data for each segment. Determining structure searchable data for a segment comprises (1) identifying one or more features of respective multimedia types in the segment; (2) correlating each of the identified features to one or more respective keywords; and (3) calculating one or more respective relevance factors for each of the keywords, where at least one of the relevance factors is based on one or more characteristics of the client device. The method also comprises the client device transmitting the structure-searchable data (including the keywords, relevance factors, and respective media types of the identified features) to an indexing server. In some embodiments, the client device may transmit the multimedia file in response to receiving a request from the indexing server.

In some embodiments, the one or more characteristics of the client device may comprise at least one of: (a) content of one or more other multimedia files stored on the client device; (b) a type of the client device; and (c) a user-specified relevance of the client device. In some embodiments, the one or more relevance factors may comprise a degree of confidence that a given keyword describes the one or more features that were correlated with that keyword.

In some embodiments, transmitting the structure-searchable data to the indexing server may further comprise transmitting data usable by the indexing server to identify a group of devices to which the client device has been registered.

Also disclosed is a client device for indexing content of a multimedia file. The client device comprises a computer processor and a memory that is coupled to the processor and stores program instructions executable by the processor to implement: (1) segmenting the content of the multimedia file into a plurality of segments; (2) determining structure-searchable data for each segment; and (3) transmitting the structure-searchable data to an indexing server. The step of determining structure-searchable data comprises: (a) identifying one or more features of respective multimedia types in the segment; (b) correlating each of the identified features to one or more respective keywords; and (c) calculating one or more respective relevance factors for each of the keywords, where at least one of the relevance factors is based on one or more characteristics of the client device. The structure-searchable data transmitted to the indexing server includes the keywords, relevance factors, and respective media types of the identified features.

Also disclosed is a method for creating a content index of multimedia content. The method comprises receiving, by an indexing server, structure-searchable data from a plurality of remote client devices, where the structure-searchable data describes content of multimedia files stored on the remote client devices. For each of the client devices, the indexing server: (1) identifies a respective client device group to which the client device has been registered, and (2) updates a content index of the client device group using the structure-searchable data received from the client device. The updating is dependent on a weighting scheme specific to the client device group. In some embodiments, the weighting scheme comprises applying respective weights to content features of different multimedia-types.

In some embodiments, the updating is also dependent on one or more relevance factors received in the structure-searchable data, where at least one of the relevance factors is based on: (1) one or more characteristics of the client device, or (2) a measure of confidence that a given keyword describes one or more features correlated with that keyword in the structure searchable data.

In some embodiments, the one or more characteristics of the client device corresponds to at least one of: (a) content of one or more other multimedia files stored on the client device; (b) a type of the client device; and (c) a user-specified weight for the client device.

In some embodiments, the method may further comprise responding to a content query received by the indexing server from one of the remote client devices. In some embodiments, the indexing server may respond by: (1) determining that the remote client device is a member of the device group; (2) determining a content index corresponding to the client device group; and (3) using the determined content index to identify one or more portions of the content responsive to the content query.

Also disclosed is an indexing server for indexing content of a multimedia file. The indexing server comprises a computer processor and a memory that is coupled to the processor and stores program instructions executable by the processor to implement: (1) receiving structure-searchable data from a plurality of client devices, where the structure-searchable data describes content of multimedia files stored on the client devices; and (2) for each of the client devices (a) identifying a respective client device group to which the client device has been registered, and (b) updating a content index of the client device group using the structure-searchable data received from the client device, where the updating is dependent on a weighting scheme specific to the client device group.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 5 is an example of an SSD table created by the indexing client, according to some embodiments.

FIG. 7 is a logical diagram illustrating server-side indexing data, according to various embodiments.

DETAILED DESCRIPTION

Figure 1:
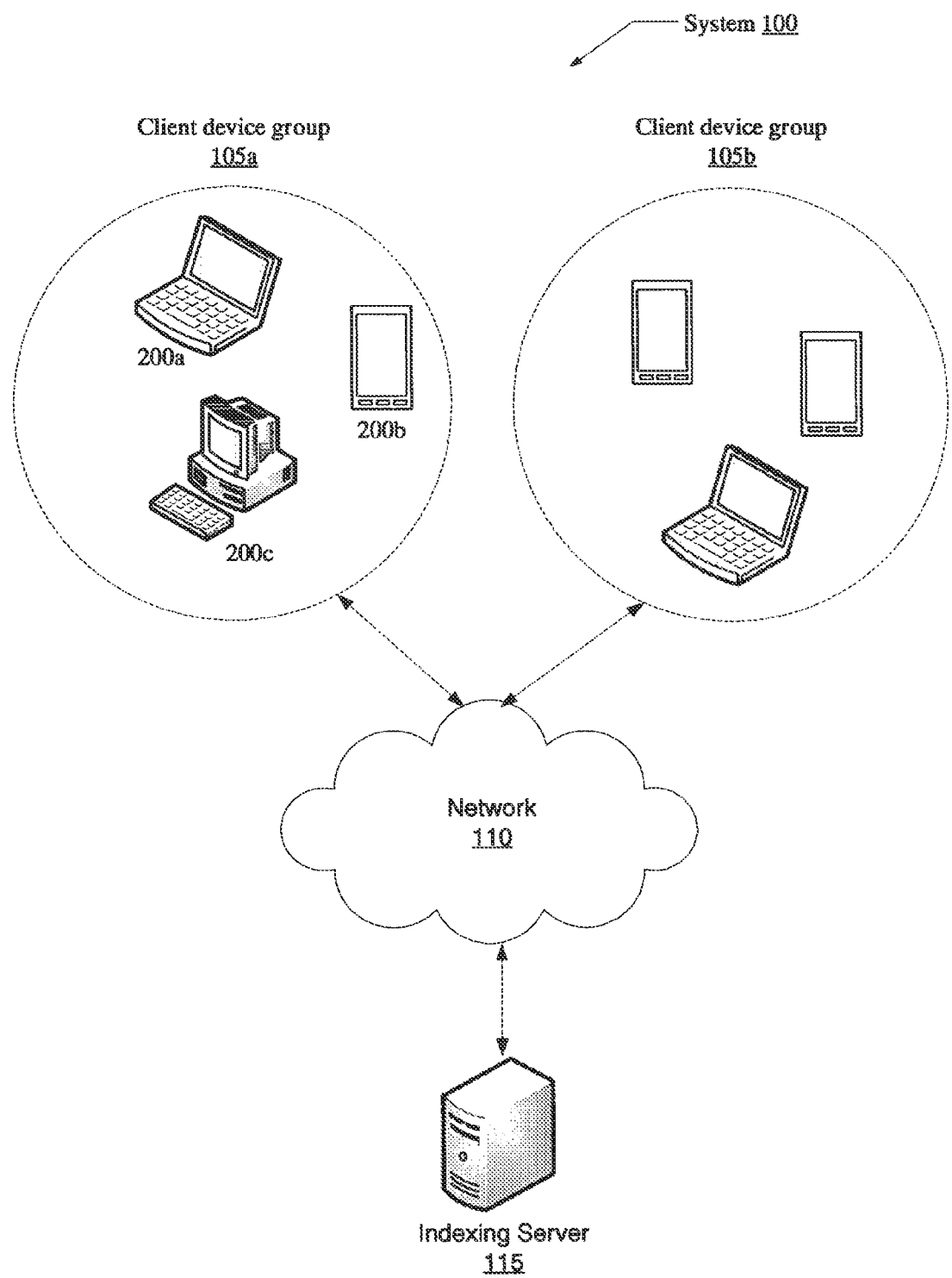
FIG. 1 is a network diagram illustrating some hardware components of a system configured to perform multimedia indexing, according to various embodiments.

In recent years, there has been a proliferation of client devices capable of capturing and/or storing multimedia content. Such client devices include smartphones, tablet computers, laptop computers, digital cameras, and other computing devices. The proliferation of such client devices has created a new content environment where an ever-growing share of the content is multimedia and such content is stored remotely on distributed client devices.

In the new content environment, traditional search and retrieval techniques are inadequate. First, traditional indexing techniques are ill-suited for indexing multimedia content. Having been developed for textual content search, traditional search engines often index only textual metadata, such as filenames or associated text, and ignore the actual content stored in multimedia files. Such an approach is inherently limited because it considers only secondary indicators and ignores primary content.

Second, search and retrieval techniques have not been adequately adapted to leverage an environment where content is created by and stored on distributed end-user client devices. Although traditional indexing techniques might consider metadata associated with multimedia files (e.g., Global Positioning System (GPS) information, filename, etc.), they largely overlook the potential of metadata that could be associated with the client device used to capture and/or store the multimedia files.

According to various embodiments, a search engine may be configured to facilitate effective search and retrieval functionality in the new content environment, where distributed client devices create and/or store multimedia content. Some embodiments, of the systems and techniques disclosed herein may address or more of the shortcomings discussed above by building a search index based on primary content of multimedia files and/or utilizing device specific data to determine content relevance.

In some embodiments, indexing software is provided and may comprise a client software component for execution on client devices (e.g., cameras, laptops, smartphones, etc.) and a server software component for execution on an indexing server. The client software component may be configured to automatically detect multimedia content created (or otherwise obtained) by the client device on which the client software component runs and to analyze that content. In some embodiments, the analysis may depend on characteristics of the client device, such as the device's type, the content stored on and/or previously created using the device, and/or on one or more user specified settings. The client software component may report the content and analysis results to the server software component, which adds the results to a content index.

In some embodiments, the server software component may maintain a separate content index for different groups of devices. For example, members of a family may register their respective client devices with the server as a single group. The server may be configured to maintain a separate index for that group of devices and to allow members of the family to query the group's index. Thus, the family members may query and discover content across their respective client devices.

FIG. 1 is a network diagram illustrating some hardware components of a system configured to perform multimedia indexing, according to various embodiments. According to the illustrated embodiment, system 100 comprises two client device groups 105a and 105b connected to indexing server 115 via a network 110. Each client device group 105 includes at least one client device 200.

The client device groupings 105 may be formed logically by registering various client devices with an indexing service (e.g., implemented on indexing server 115). For instance, a family that wishes to share a content index for content stored on their multiple client devices may have registered the three client devices in logical group 105a. In the illustrated embodiment, device group 105a includes a laptop computer 200a, a desktop computer 200b, and a smartphone 200c. A device group may include any number of client devices capable of storing multimedia files and accessing network 110. Furthermore, any number of client device groups is possible.

Each client device 200 in groups 105 may execute an indexing client application 215 (or indexing client 215 for short) (see FIG. 2), which may execute in the background and/or be invoked on demand. The indexing client 215 may monitor the client device 200 for new and/or modified multimedia files. In response to finding a new or modified file, the indexing client 215 may analyze the content of the multimedia file and report its analysis to the indexing server 115. For example, when a new picture is loaded onto the personal computer 200c in group 105a, the indexing client 215 executing on personal computer 200c may detect the new picture, analyze it to identify various features, and send the analysis results over network 110 to indexing server 115. The analysis results and detailed methods for performing the analysis are discussed below in relation to FIG. 4.

Network 110 may correspond to any type or combination of communication networks, including local-area networks, wide-area networks, wireless networks, cellular networks, etc. Without loss of generality, network 110 may be described herein as the Internet.

Indexing server 115 may correspond to any number or type of computers usable to execute the indexing server component. For instance, indexing server 115 may correspond to a single computer, a cluster of computers, a distributed architecture, and/or any other hardware configuration usable to implement the indexing functionality described herein.

Software executing on indexing server 115 may maintain a logically separate index for each group of devices. That is, when indexing server 115 receives content analysis from a device in group 105a, the indexing server may update only the index corresponding to device group 105a. Similarly, when indexing server 115 receives a query for content from a client device in group 105a, the indexing server 115 may satisfy the query using the index corresponding to that group (i.e., not using an index corresponding to another group).

Figure 2A:
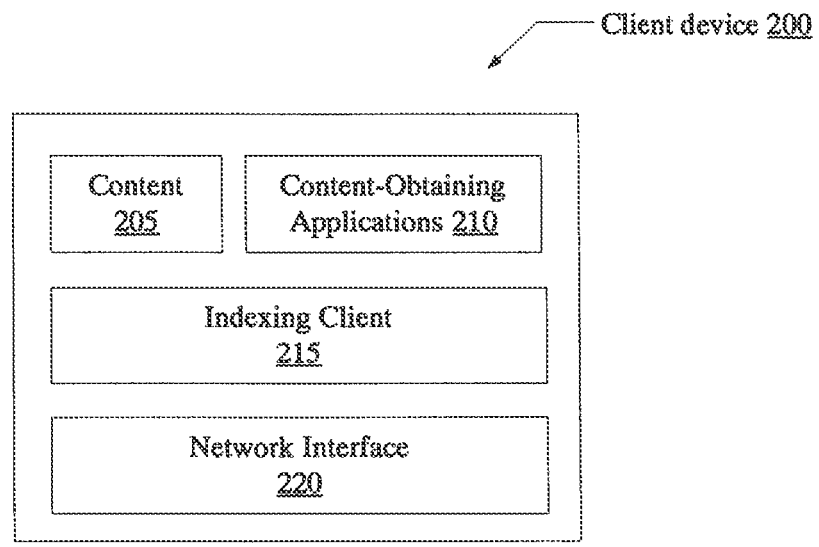
FIG. 2a is a block diagram illustrating the logical components of a client device, according to some embodiments.

FIG. 2a is a block diagram illustrating the logical components of an example client device 200, according to some embodiments. Client device 200 may correspond to any device capable of storing multimedia content, such as any device in groups 105 of FIG. 1. As used herein, the term "device" refers to any client device, such as client device 200, that is capable of storing content (e.g., 205) and executing an indexing client (e.g., 215), as described herein.

According to the illustrated embodiment, client device 200 includes one or more content-obtaining applications 210, which are usable to create or otherwise obtain multimedia content 205. Multimedia content 205 may include pictures, movies, audio recordings, or any other type of multimedia files. Content-obtaining software 210 may include any programs or applications for creating multimedia content (e.g., picture software, movie software, hardware drivers, etc.) or for otherwise obtaining multimedia content (e.g., web browser with which multimedia files may be downloaded, driver software for a hardware device through which multimedia files may be received, etc.).

Client device 200 may also include indexing client 215, which may facilitate the indexing of content 205 on indexing server 115115. In various embodiments, indexing client 215 may be configured to monitor content 205 for changes (e.g., new files, modified files, etc.), to analyze the new/updated content, and to report the analysis results to indexing server 115 115 through a network interface, such as 220. Network interface 220 may include any networking software and/or hardware that enables indexing client 215 to communicate with a remote indexing server over a network.

In some embodiments, the analysis results sent to the indexing server may comprise "structure-searchable data" (SSD), as described herein. Among other types of information, SSD may include device-specific weight parameters, which may be based on the device type, on content 205, on user-specified parameters, and/or on other types of device-specific information.

Figure 2B:
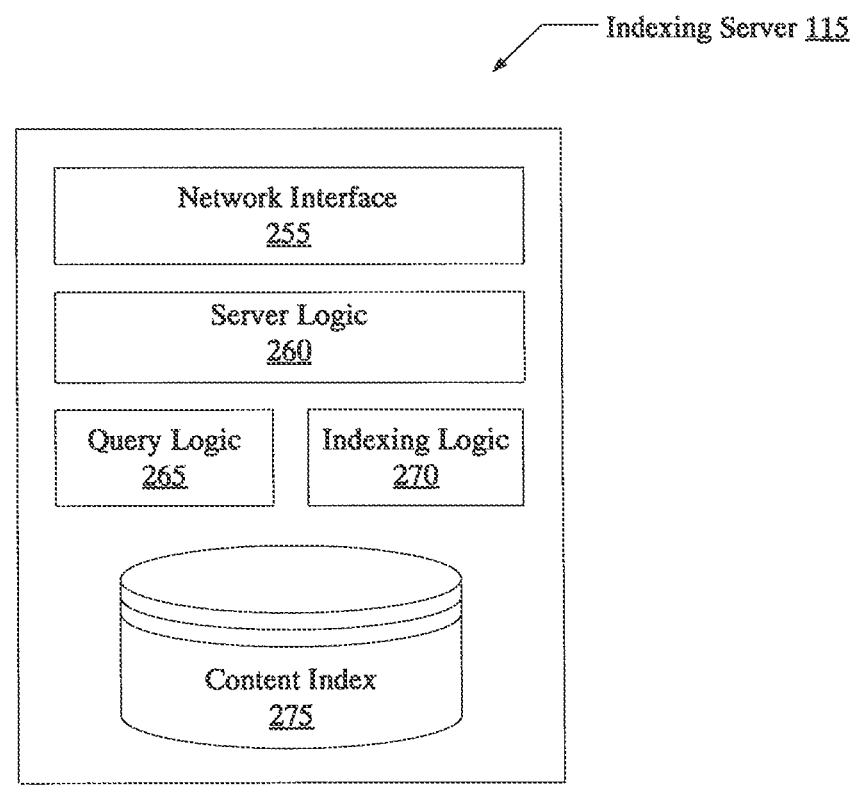
FIG. 2b is a block diagram illustrating some logical components of an indexing server, according to some embodiments.

FIG. 2b is a block diagram illustrating some possible logical components of an example indexing server 115115, according to some embodiments. 115 In various embodiments, the functions of indexing server 115 may include maintaining an index of content stored at remote devices and satisfying queries for that content based on the index.

According to the illustrated embodiment, indexing server 115 includes a network interface 255, which enables the server to communicate with client devices, such as 200, over a network.

Indexing server 115 may include server logic 260, which may be configured to receive requests from client devices and to service those requests. For example, server logic 260 may include a web server, web application server, web application(s), and/or any number of other remote service components. To accept requests from client devices, server logic 260 may expose various interfaces, such as various web services and/or other programmatic APIs that may be invoked by indexing client 215.

In response to receiving a request for service, server logic 260 may invoke one or more backend components, such as query logic 265, indexing logic 270, and content index 275. In various embodiments, backend components 265-275 may be implemented as part of one or more web applications, as separate libraries, and/or as any other combination of software.

In the illustrated embodiment, indexing server 115 includes indexing logic 270, which may be configured to analyze SSD received from indexing clients (e.g., 215) executing on one or more remote devices. In response to receiving SSD from a given device, indexing logic 270 may determine the group to which the device belongs and identify group-specific indexing parameters, as described herein. Indexing logic 270 may then use the group-specific indexing parameters and received SSD to update content index 275. In some embodiments, the group-specific weight parameters may include group-specific weights for different feature types in the multimedia content.

Indexing server 115 may include query logic 265, which may be configured to query content index 275 in response to client requests. For example, server logic 260 may receive a query for content from client 200. The query may specify various parameters describing the content, such as one or more keywords. In response to receiving the query, server logic 260 may invoke query logic 265. Query logic 265 may respond by querying content index 275 to discover content that best matches the client's query. In response to identifying the most appropriate content, query logic 265 may notify server logic 260 of the content, and sever logic 260 may forward indications of the content back to the client device. A method for servicing a client query (e.g., locating and returning an indication of content responsive to the query) is discussed below in relation to FIG. 8.

In various embodiments, content index 275 may be implemented in many forms. For example, content index 275 may be implemented as one or more files one or more file systems, as one or more databases, as in-memory objects that are periodically written back to persistent storage, and/or any other index implementation.

The components of client device 200 and indexing server 115 are broken out logically in FIGS. 2a and 2b for explanatory purposes. In various implementations however, functionality of different components may be broken down further and/or combined. It is intended that this disclosure cover all such embodiments.

Figure 3:
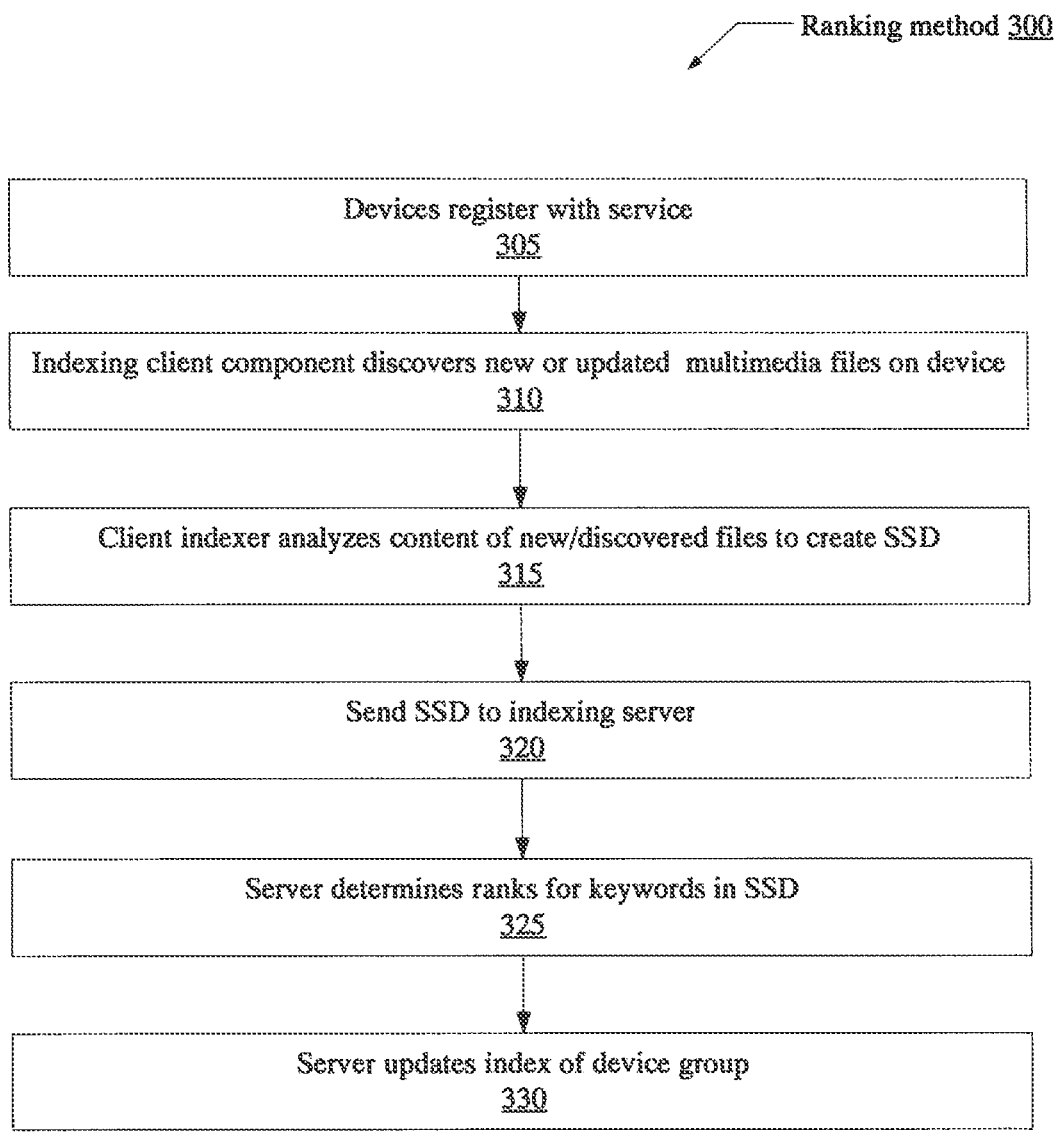
FIG. 3 is a flow diagram illustrating a method for creating and maintaining a centralized index of distributed content, according to some embodiments.

FIG. 3 is a flow diagram illustrating an indexing method 300 for creating and maintaining a centralized index of distributed content, according to some embodiments. Indexing method 300 may be implemented by a combination of client and server components, such as indexing client 215, server logic 260, and indexing logic 270.

According to FIG. 3, indexing method 300 begins in 305 when one or more users register devices with the indexing service. For each device, registration step 305 may include downloading indexing client 215 onto the client device 200 and/or installing the indexing client 215 onto the client device 200. In some embodiments, registration step 305 may comprise creating authentication credentials (e.g., username/password), specifying a group of devices to which the device belongs, and/or other setup steps.

Device groups correspond to groups of devices whose owners wish to share content stored on those devices. For instance, members of a family may register their devices as one group in order to share pictures stored on those devices. To enable sharing and searching of content across multiple devices in a group, the indexing server may create a logically separate index for the content in each group. One or more users of devices in the group may set group-specific indexing parameters to guide the indexing logic (e.g., 270) in creating and maintaining the group's index.

In step 310, the indexing client 215 discovers new or updated multimedia files, such as picture or movie files. In some embodiments, the indexing client 215 may be configured to search (periodically or on demand) one or more storage locations (e.g., file system directories) for new or recently updated files. A new or updated file may correspond to a file that has been created, stored, modified after the client's most recent report to the indexing server.

In 315, indexing client 215 analyzes the content of the new/updated files to create "structure-searchable data" (SSD). As used herein, the term "structure-searchable data" corresponds to data that identifies various "features" in a piece of multimedia content. The term "feature" refers to any identifiable aspect of the content that can be used to index the content and thereby to determine the relevance of the content to a user query. Examples of features may include particular images, sounds, text, voices, or other features present in the content.

In many embodiments described herein, SSD also includes respective keywords associated with each identified feature and device-specific indexing parameters. Device-specific indexing parameters may affect the way in which the server's indexing logic uses the SSD to update the device group's index. For example, in various embodiments, the SSD may specify one or more device-specific weights. An example of a method for creating SSD is described in more detail with relation to FIG. 4.

In step 320, the indexing client 215 sends the SSD to the indexing server 115 for incorporation into the device group's index. Subsequent steps 325 and 330 may therefore be performed by indexing server 115 (e.g., using indexing logic 270).

In 325, indexing server 115 analyzes the SSD to determine the relevance of various keywords to the features identified in the SSD. In some embodiments, the SSD already indicates the keywords and the features and/or feature types with which each keyword was associated. In such embodiments, the server need only determine the relevance of each keyword to the content containing the associated features. In some embodiments, the relevance determination step of 325 may depend on device-specific parameters and/or on group-specific parameters. A detailed method for determining relevance of keywords is discussed with relation to FIGS. 6-7.

In 330, the indexing server 115 updates the device group's content index to reflect the received SSD data and relevance determinations. Thus, method 300 is operable to create and update a content index, which can later be used to query distributed content.

Figure 4:
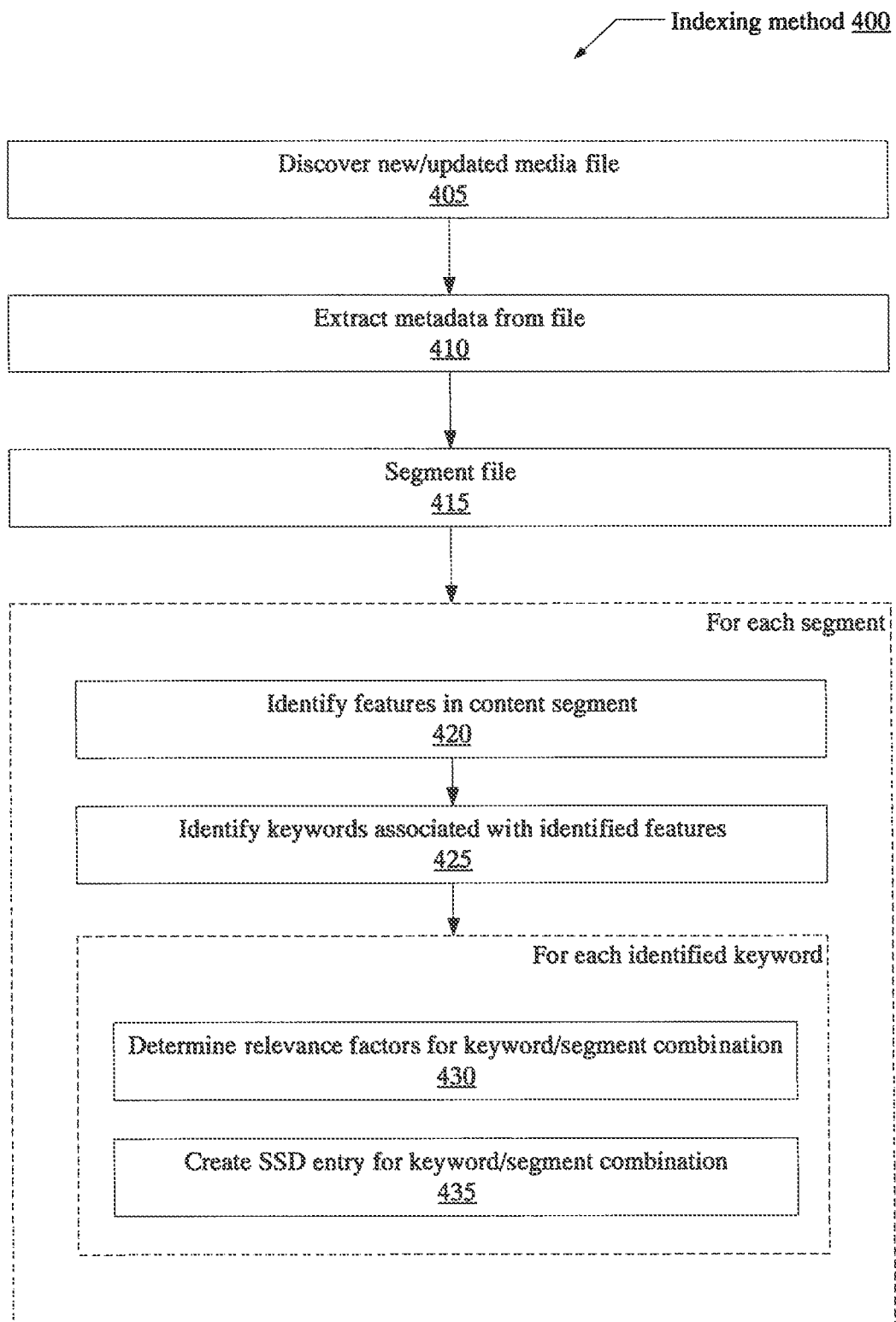
FIG. 4 is a flow diagram illustrating a method for analyzing multimedia content to create SSD, according to some embodiments.

FIG. 4 is a flow diagram illustrating a method 400 for analyzing multimedia content to create SSD, according to some embodiments. Method 400 may be performed on a client device by an indexing client component, such as 215 of FIG. 2. Method 400 may correspond to a more detailed view of steps 310 and 315 of FIG. 3.

Method 400 begins when indexing client 215 discovers a new or updated multimedia file, as in 405. As described above, indexing client 215 may be configured to monitor a given directory for new/updated files and/or may be invoked manually. For purposes of explanation, the multimedia file in the examples below is a movie file. However, it should be noted that the techniques described herein are applicable to any multimedia file.

In 410, the indexing client 215 extracts metadata from the file. Such file metadata may include date/time, location, file name, user-generated tags, and/or other secondary indicia of the content's subject matter.

In 415, the multimedia file is segmented. For example, the file may be segmented (e.g., by time, scene, etc.) into multiple time frames. In such embodiments, the time frames may be of a predefined length (i.e., static) or of a length that varies depending on file attributes (i.e., dynamic). The length of a dynamic time frame may be vary depending on different attributes, such as the overall length of the movie, the number of features identified in each segment, degree of feature change, and/or other characteristics. For example, a movie file may be segmented into contiguous segments such that there is at least a minimum degree of difference between the features of each segment. Dynamic segmentation may also combine various criteria (e.g., minimum degree of difference and minimum length).

For each segment of the file, the indexing client 215 executes steps 420-435. In 420, the indexing client 215 analyzes the segment to identify features that appear in the segment. As noted above, the term "feature" may refer to any recognizable pattern within the file's content that can be associated with a keyword. A feature may be of any of various media types, such as a visual feature (e.g., image of a bird), an audio feature (e.g., call of the bird), a textual feature (e.g., image text describing the bird), a voice feature (e.g., narration describing the bird), or others.

In 425, the indexing client 215 identifies keywords associated with the features identified in 420. For example, if an identified feature is an image of a pelican, the feature may be associated with the keywords "pelican", "bird", "animal", "beak", and/or other keywords.

To identify features (as in 420) and associate those features with keywords (as in 425), the indexing client 215 may employ various artificial intelligence techniques, including image recognition, face recognition, voice recognition, sound recognition, pattern recognition, and/or other techniques. Many such techniques are known in the art and any combination of such known and/or future techniques may be utilized. For example, video shot segmentation may be performed using known digital video retrieval techniques. In some embodiments, keywords associated with those features may be determined using known machine learning techniques, such as support vector machines (SVM), and/or statistical approaches, such as hidden markov models (HMM) and Bayesian Belief Networks (BBNs). In some embodiments, Audio feature detection may be performed by known voice recognition techniques.

Once all the features in the segment have been identified and associated with one or more respective keywords, the indexing client 215 may evaluate each keyword to determine relevance factors and to create an SSD entry for the keyword/segment combination. The iteration over each keyword associated with the segment is indicated by the dashed box.

In 430, the indexing client 215 determines one or more relevance factors for the keyword. The particular relevance factors may vary across embodiments. For instance, in some embodiments, the relevance factors of 430 may include an indication of the types of features (e.g., image, text, voice, sound, etc.) with which the keyword was associated in 425.

In some embodiments, the relevance factors may include a prominence score indicating how prominently the features associated with the keyword are present in the segment. Such a prominence score may be based on any number of factors, such as duration of a feature, whether a feature appeared in the foreground or background, and/or others.

In some embodiments, the relevance factors determined in 430 may include a confidence interval (i.e., degree of confidence) indicating how strongly the keyword is correlated with the associated features. For example, the confidence interval may be expressed as a faction between 0 and 1. When a manual scan or automatic algorithm indicates the utmost confidence that the keyword can be associated with its respective features, the confidence interval may be 1. A scan or algorithm with lower confidence may indicate a confidence interval of 0.5 and so forth.

In some embodiments, the relevance factors determined in 430 may be based on one or more characteristics of the client device 200 (i.e., "device-specific characteristics"). Such device-specific characteristic may dependent on any number of factors, such as the type of device, user-specified device weights, other content stored on the device, and/or others. For instance, the indexing client 215 may determine a factor based on device type by attaching higher weight to pictures taken by cameras than to pictures taken by laptops. In another example, the indexing client 215 may determine a factor based on user-specified weights by allowing users to set the overall importance of media stored on the given device or of a given type of media stored on the given device.

In some embodiments, the indexing client 215 may calculate a device-specific relevance factor for a given keyword based on other content 205 stored on the client device 200. For instance, the indexing client 215 may track the features and keywords associated with other content 205 stored on and/or created by the client device 200. The indexing client 215 may then assign greater weight to keywords and/or features that are frequently associated with other content on the same device. For example, if a particular camera stores many pictures of its owner's son Olle, it is more likely that new pictures found on the device will also be of Olle. Accordingly, when the indexing client 215 on the device associates the keyword "Olle" with a new picture, the client may recognize that the keyword is also associated with many other pictures on the device, and in response, attach a high device-specific weight to the particular keyword.

In 435, the indexing client 215 records the SSD data for the keyword/segment combination in an SSD data structure. In some embodiments described herein, the SSD data structure for a keyword/segment combination is an entry in an SSD table, as illustrated in FIG. 5. However, it should be recognized that the SSD table is exemplary only and that the same data can be stored in other configurations in other embodiments.

FIG. 5 is an example of an SSD table created by the indexing client 215, according to some embodiments. The table may correspond to SSD that a client derived by processing a given multimedia file according to method 400.

In the illustrated embodiment, each row of the SSD table represents a respective entry corresponding to a given keyword/segment combination. The indexing client 215 may record such an entry in step 435 of method 400. In various embodiments, the indexing client 215 may send each row separately or may optimize the transmission by sending a collection of rows together and omitting redundant data.

Each SSD entry in table 500 includes fifteen fields. Fields 1-3 contain metadata of the file from which the SSD was derived. The indexing client 215 may have gathered such data from the file in step 410 of method 400. In the illustrated example, the metadata includes the name of the file, the date at which the file was created or modified, and the location where the file was created (e.g., GPS data). In other embodiments, the SSD entry may contain any other file metadata.

Fields 4 and 5 contain metadata that identify the origin of the file, including the user and device that has sent the SSD entry. The UID field may contain a username identifying the user who created the file and/or the username of the user who submitted the SSD entry. The DevID field may identify the particular device used to capture or store the media file. For example, in the illustrated embodiment, the file was captured using a device assigned the identifier "myPhone." In various embodiments, any other metadata describing the origins of the file may be sent. For example, such metadata may identify the device that created the file and/or the SSO, the owner of such devices, the operator of such devices, etc.

Fields 6 and 7 indicate the segment and keyword. The segment field indicates the file segment to which the entry corresponds. The keyword field indicates a keyword that the indexing client 215 associated with one or more features in that segment (e.g., in steps 420-425). The combination of file-segment-keyword for a given entry is therefore unique across all entries. That is, each entry describes the relationship of a given keyword to a given segment of a particular file.

Fields 8-11 indicate whether or not a given type of feature in the file segment has been associated with the keyword. For example, in segment 1, the keyword "Lisa" has been associated with at least one image feature and at least one voice feature. In segment 2, the same keyword was associated with a text feature and with a voice feature. In some embodiments, the entry may further include a dominant defining characteristic of each type of feature. For example, if the file segment contains a video type feature and color is the defining characteristic for video, then the entry may include an indication of the dominant color of the video feature (e.g., blue). In another example, if the file segment contains an audio feature and tonality (or sharpness, roughness, etc.) is the defining characteristic for audio feature, then the entry may include an indication of the dominant tonality for the audio feature.

MOM Fields 12-14 indicate relevance factors for the keyword (e.g., those determined in 430 of method 400). In the illustrated embodiment, the relevance factors include a feature prominence (Prom), a confidence interval (WRel), and a device-specific weight (WFact), as described above. For instance, the prominence field (Prom) may indicate the number of seconds during which the features associated with the keyword were present. The confidence interval (WRel) may indicate the confidence with which the keyword was associated with the indicated features. In the illustrated embodiment, WRel is represented as a fraction between 0 and 1. The device-specific weight (WFact) may indicate an increased weight for keywords that are heavily represented on the device. In the illustrated embodiment, the WFact weight is represented as a scaling factor between 1 and 2. Additional fields containing additional relevance factors calculated by the client are possible. Finally, field 15 is the relevance score, which indicates the relevance of the keyword to the file segment. In some embodiments, the indexing client 215 may leave the relevance score field blank, permitting the indexing server 115 to determine the relevance score based on the SSD's relevance factors and on one or more parameters specific to the device group. The group-specific parameters may be stored on the indexing server 115 and applied uniformly to all SSD entries received from devices in the group.

In some embodiments, an SSD entry may include additional fields not shown in table 500. For instance, a quality factor (WQual) indicating the media quality of the segment may be included, which may be based on MOS (Mean Opinion Score) for the segment and normalized within a given range (e.g., 0-1). In such embodiments, the MOS may be calculated using a parametric audiovisual model, such as the P.NAMS model from ITU (currently being standardized in SG12 Q14 of ITU-T).

Figure 6:
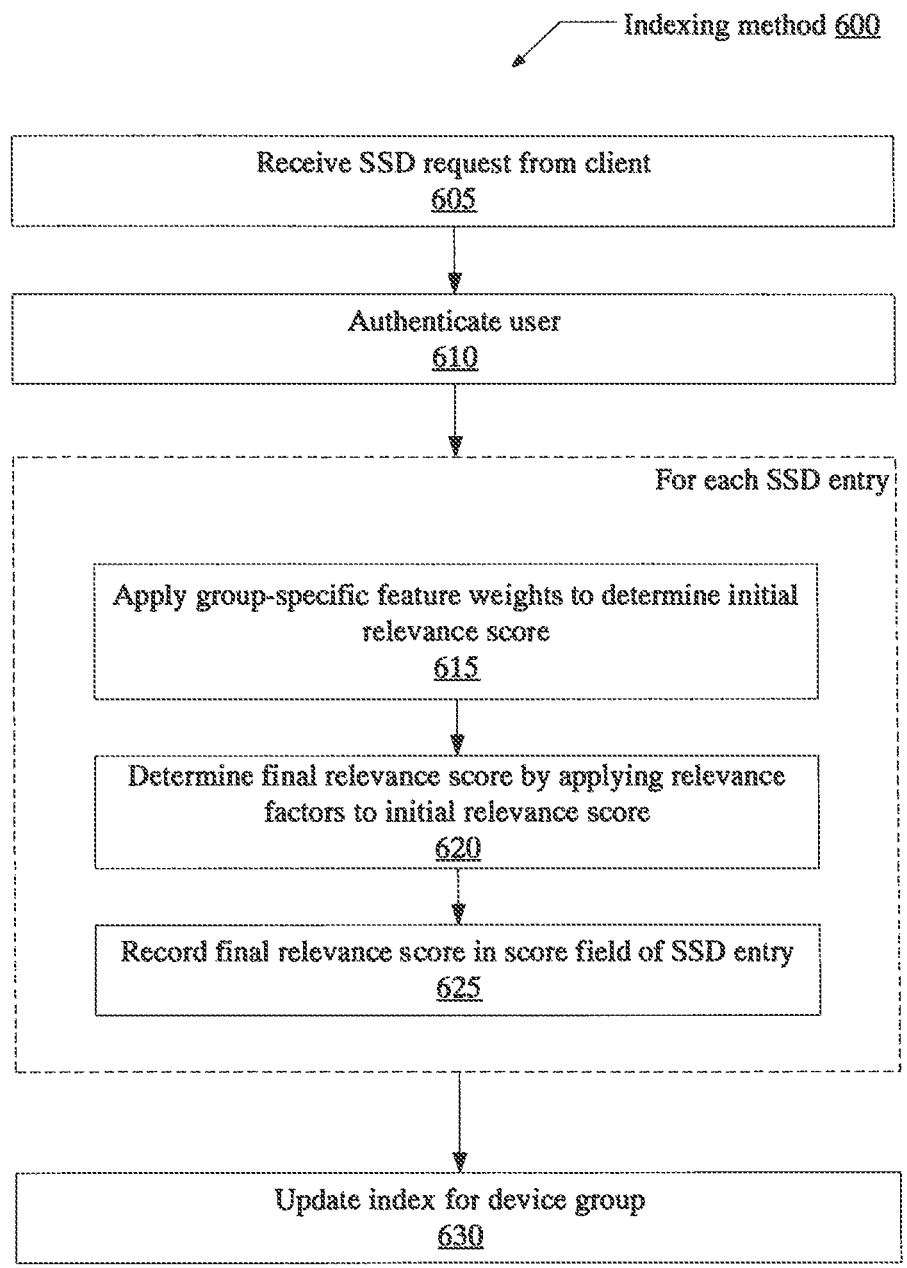
FIG. 6 is a flow diagram illustrating a method by which an indexing server may determine a relevance score for an SSD entry gathered from a remote device, according to some embodiments.

FIG. 6 is a flow diagram illustrating a method by which an indexing server 115 may determine a relevance score for an SSD entry gathered from a remote device, according to some embodiments. Method 600 may be performed by an indexing server, such as indexing server 115 using indexing logic 270.

Method 600 begins in 605 where the indexing server 115 receives SSD from indexing client 215 on a given device 200. The SSD may include any number of SSD entries, such as those of table 500. For example, the indexing server 115 may receive a message from indexing client 215 that includes data representing a given SSD entry (e.g., given row of SSD table 500). Such a message, which may be in the form of an HTTP message, may include a respective field for various columns of the SSD entry, such as a file identifier field, a date field, a location field, a UID field, a DevID field, a segment field, a keyword field, an img field, a text field, a sound field, a voice field, a prom field, a WRel field, a WFact field, and/or other fields. In some embodiments, the indexing server 115 may receive the SSD in 605 through a programmatic web API (e.g., web service, RESTful service, etc.). The SSD request of 605 may include authentication information (e.g., username, password, etc.), which may be authenticated in 610 to identify the appropriate account.

Once the indexing server 115 has received an SSD request and authenticated the requesting user, the indexing server 115 may iterate over the received SSD entries and calculate a respective relevance score for each. The iteration is indicated in FIG. 6 by the dashed box.

In various embodiments, a device group may be associated with a respective set of weights, where each weight corresponds to a different feature type (e.g., image, sound, text, voice, etc.) and reflects how important that type of feature is to the relevance of a keyword. In various embodiments, the weights may be default presets, user-defined, dynamically determined, and/or determined in other ways. Each device group may be associated with a respective set of feature type weights.

In 615, the indexing server 115 identifies the group-specific feature weights associated with the device group to which the sending device belongs and uses those weights to determine an initial relevance score for the keyword. For example, in some embodiments, the indexing server 115 may determine an initial relevance score for a given entry by summing the weights of every type of feature denoted in the entry. Thus, if a given entry indicates that the keyword was associated with a visual feature and with an audio feature, indexing server 115 may calculate the initial weight for the entry as the weight assigned to visual-type features plus the weight assigned to audio-type features.

In 620, the indexing server 115 determines the final relevance score by scaling the initial relevance score using the SSD-supplied relevance factors (e.g., Prom, WRel, WFact, etc.). The scaling may correspond to any function of the initial relevance score and SSD-supplied relevance factors. For example, in some embodiments, a final relevance score for an entry in SSD table 500 might be calculated as the (initialScore+Prom) WRel*WFact. Thus, degrees of prominence, confidence, and/or device-specific relevance may each affect the final relevance score. Although one augmentation function has been proposed here, other functions are possible in other embodiments. Additionally, in embodiments where an SSD entry includes additional factors (e.g., WQual), the final relevance score may be dependent on those factors (e.g., (initialScore+Prom) *WRel*WFact*WQual).

In 625, the indexing server 115 records the final relevance score in the score field of the SSD entry. Once a final relevance score has been determined for an SSD entry, the SSD entry is complete and the indexing server 115 may use the entry to update the logical index associated with the device group.

In some embodiments, the index may be implemented as any combination of in-memory data structures, files in a file system, tables and/or entries in one or more databases, or other storage formats. The index may be used to service queries by correlating keywords with file names and/or segments most relevant to that keyword.

FIG. 7 is a logical diagram illustrating server-side indexing data, according to various embodiments. For clarity, the data is represented three tables. However, it should be understood that in different embodiments, the same data may be arranged differently.

In FIG. 7, SSD table 700 comprises the same data as SSD table 500 of FIG. 5, except that the indexing server 115 has calculated respective relevance scores for each entry. The indexing server 115 may calculate the relevance scores by performing method 600 of FIG. 6. According to method 600, the indexing server 115 first identifies a set of group-specific feature weights, such as those in weight table 710. Weight table 710 lists the weight of each media type for the group. Each entry includes a groupID field because different groups may assign different respective weights to the same media type. Weight table 710 lists only the weights for group "6".

For each entry in SSD table 700, the indexing server 115 calculates an initial relevance score based on the feature types marked in the entry and on the respective weights of those media types as noted in weight table 710. For instance, the uppermost entry in SSD table 700 (i.e., F/1/Lisa) denotes that the keyword "Lisa" is associated with an image-type feature and with a voice-type feature. According to weight table 710, those two feature-types have a weight of 10 and 2 respectively in the group. Accordingly, the initial weight (e.g., calculated in 615) may be a function of 10 and 2 (e.g., 10+2=12).

As in 620, the indexing server 115 may then determine a respective final relevance score for each entry based on the entry's initial relevance score and the relevance factors (e.g., Prom, WRel, WFact) listed in that row. In FIG. 7, the final relevance scores are calculated as (initialScore+Prom) *WRel*WFact.

Once the indexing server 115 calculates the final relevance scores for each entry, the indexing server 115 may add the entries to an index, such as index 720. The index 720 may be optimized for quick retrieval and/or entry. In the illustrated embodiment, index 720 lists for each entry, only the final relevance score and the fields that uniquely identify the entry.

Figure 8:
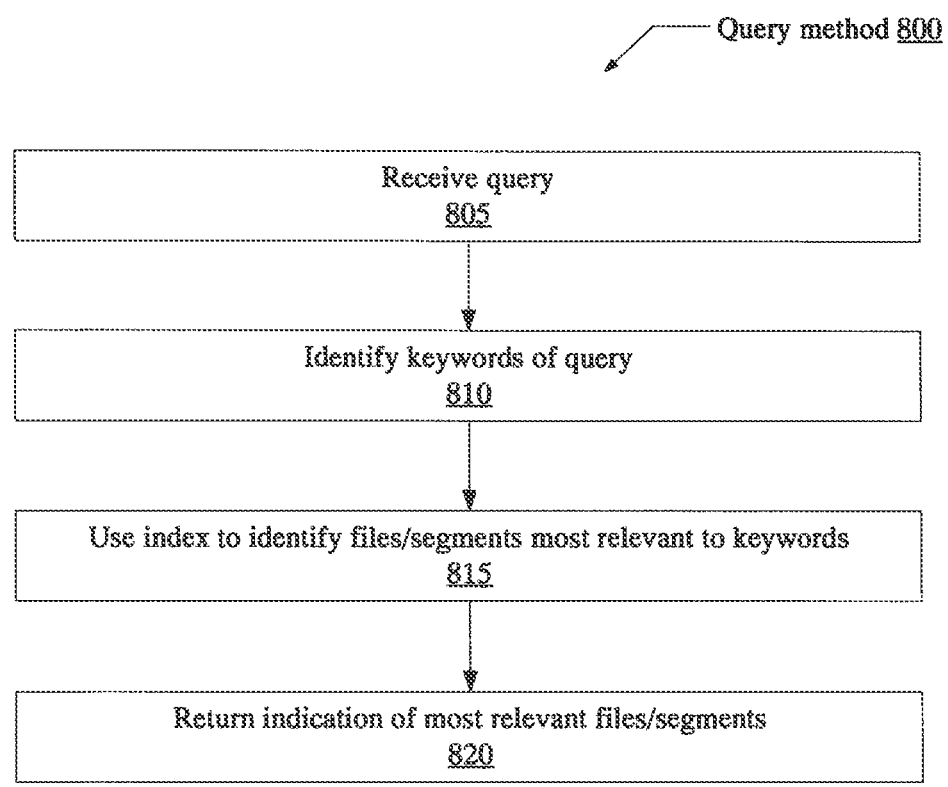
FIG. 8 is a flow diagram illustrating a method for using the index (e.g., index 720) to identify relevant content stored on distributed devices, according to some embodiments.

FIG. 8 is a flow diagram illustrating a method for using the index (e.g., index 720) to identify relevant content stored on distributed devices, according to some embodiments. Query method 800 may be performed by query logic 265.

According to the illustrated embodiment, query method 800 begins in 805 when the query logic 265 receives the query. As described above, the query may comprise one or more keywords and/or multimedia content. For example, a user may query the database for videos that are similar to a given query video.

In 810, the query logic 265 identifies one or more keywords from the query. If the query is provided in the form of text, then identifying the keywords in 810 may simply involve identifying the keywords indicated by the text. Identifying keywords indicated by text may include parsing the text, interpreting regular expressions, and/or other parsing/interpretation activity. If the query is provided as a multimedia file (e.g., another movie, a picture, etc.), then identifying the keywords in 810 may comprise extracting features from the query multimedia and identifying keywords associated with the extracted features. The feature extraction may be performed similarly to the feature extraction used to create SSD (e.g., method 400 of FIG. 4).

In 815, the query logic 265 uses the index (e.g., 720) to identify files and/or segments that are most relevant to the identified query keywords. In 820, the query logic returns an indication of the most relevant files and/or segments identified in 815. In some embodiments, the query logic 265 may simply return an indication of the desired content and where it is stored. In some embodiments, the query logic 265 may send the querying client a URL where the result may be downloaded. The URL may point the remote device on which the content resides, to a location on the indexing server 115 where the content is stored, or to another location. In some embodiments, the indexing server 115 may request that the remote device that hosts the content transmit the desired content to the indexing server 115 and/or to the querying device. Other means of delivering the results are possible.

Figure 9:
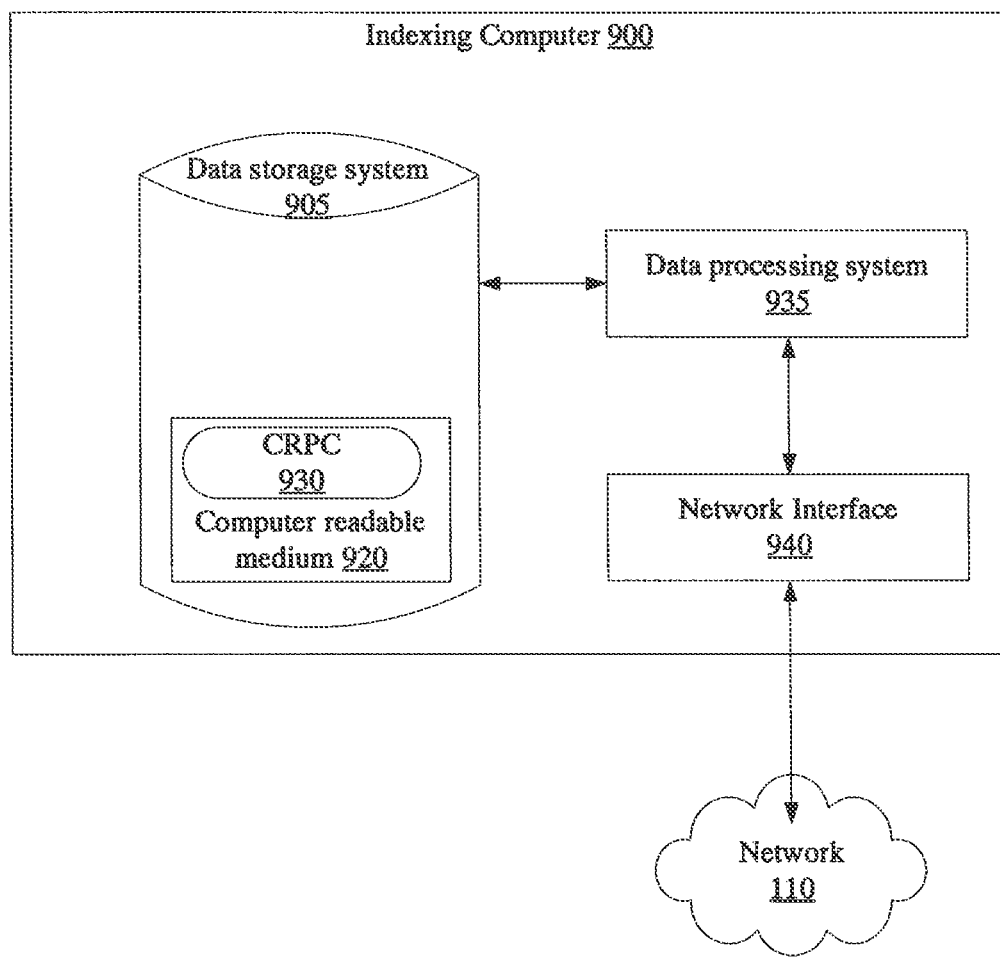
FIG. 9 illustrates a possible implementation for at least some components of an indexing client or indexing server computer, according to some embodiments.

FIG. 9 illustrates a possible implementation for at least some components of a client device or indexing server, according to some embodiments. As shown in FIG. 9, indexing computer 900 may include: a data processing system 935, which may include one or more data processing devices each having one or more microprocessors and/or one or more circuits, such as an application specific integrated circuit (ASIC), Field programmable gate arrays (FPGAs), etc; a network interface 940 for receiving messages (e.g., messages transmitted from a client 105) and transmitting messages; a data storage system 905, which may include one or more computer-readable mediums, such as non-volatile storage devices and/or volatile storage devices (e.g., random access memory (RAM)).

In embodiments where data processing system 935 includes a microprocessor, a indexing computer program product is provided. Such a computer program product may include computer readable program code 930, which implements a computer program, stored on a computer readable medium 920. Computer readable medium 920 may include magnetic media (e.g., a hard disk), optical media (e.g., a DVD), memory devices (e.g., random access memory), etc. In some embodiments, computer readable program code 930 is configured such that, when executed by data processing system 935, code 930 causes the processing system to perform steps described above (e.g., steps described above with reference to the flow charts of FIGS. 2-8).

In other embodiments, indexing computer 900 may be configured to perform steps described above without the need for code 930. For example, data processing system 935 may consist merely of specialized hardware, such as one or more application-specific integrated circuits (ASICs). Hence, the features of the present invention described above may be implemented in hardware and/or software. For example, in some embodiments, the functional components of collaboration server described above may be implemented by data processing system 935 executing computer instructions 930, by data processing system 935 operating independent of any computer instructions 930, or by any suitable combination of hardware and/or software.

Figure 10A:
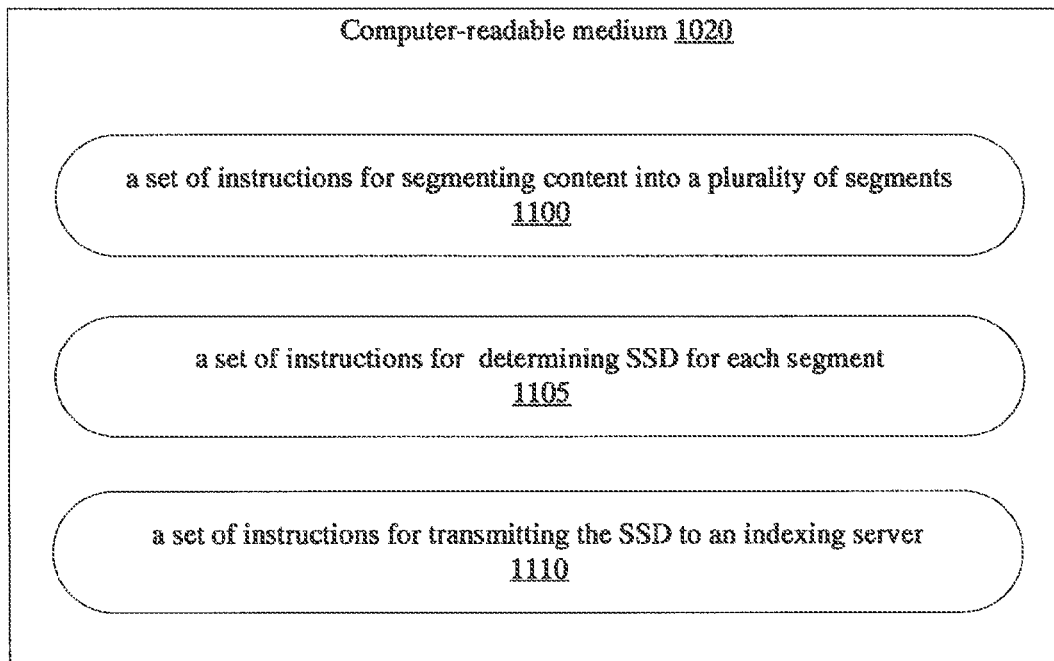
FIG. 10a illustrates an embodiment of a computer readable program code (CRPC) 930, according to some embodiments.

FIG. 10a illustrates an embodiment of a computer readable program code (CRPC) 930, according to some embodiments. In the embodiment shown, CRPC 930 includes (1) a set of instructions for segmenting content into a plurality of segments, (2) a set of instructions for determining SSD for each segment, and (3) a set of instructions for transmitting the SSD to an indexing server. As used herein, the term "plurality" refers to two or more.

Figure 10B:
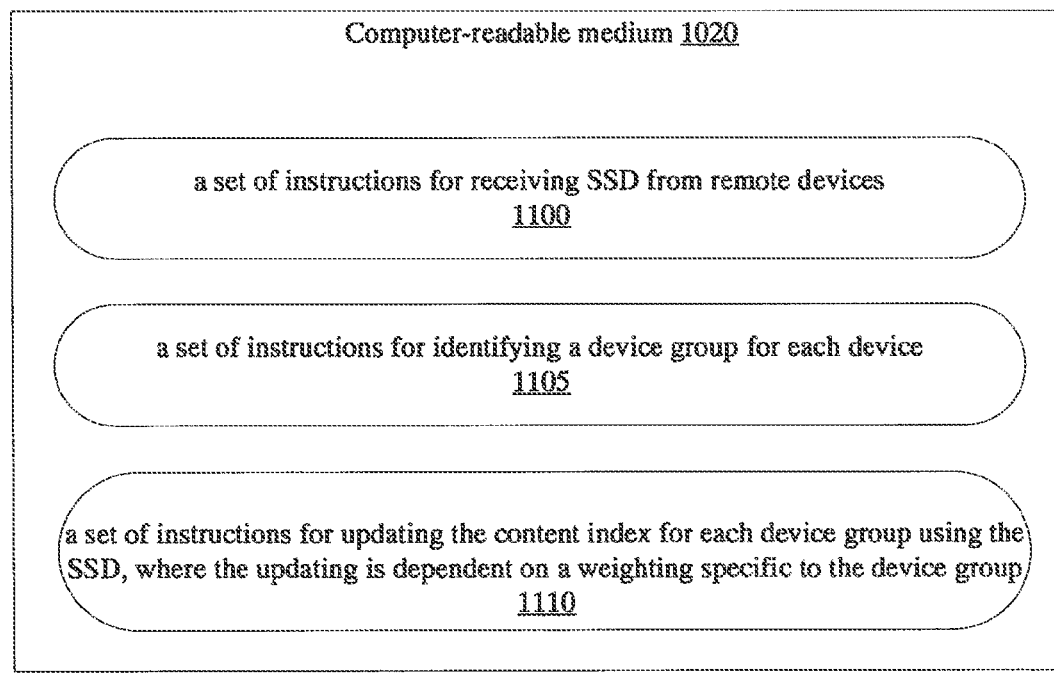
FIG. 10b illustrates an embodiment of a computer readable program code (CRPC) 930, according to some embodiments.

FIG. 10b illustrates an embodiment of a computer readable program code (CRPC) 930, according to some embodiments. In the embodiment shown, CRPC 930 includes (1) a set of instructions for receiving SSD from remote devices, (2) a set of instructions for identifying a device group for each device, and (3) a set of instructions for updating the content index for each device group using the SSD, where the updating is dependent on a weighting specific to the device group.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:
1. A method for indexing content of a multimedia file, the method comprising:

segmenting the content of the multimedia file, by a client device, into a plurality of segments;
determining, by the client device, structure-searchable data for each segment, wherein the determining comprises:
identifying one or more features of respective multimedia types in the segment;
correlating each of the identified features to one or more respective keywords; and
calculating one or more respective relevance factors for each of the keywords, wherein at least one of the relevance factors is based on one or more characteristics of the client device; and
transmitting, by the client device, the structure-searchable data to an indexing server, wherein the structure-searchable data includes the keywords, and further includes, for each included keyword, a corresponding relevance value and information identifying at least one media type of a feature with which the keyword is correlated, wherein
for at least one keyword included in the structure-searchable data, the structure-searchable data comprises first media type information indicating that the keyword is associated with a first media type and second media type information indicating that the keyword is also associated with a second media type that is different than the first media type.

2. The method of claim 1, wherein the calculating of the at least one of the relevance factors is based on (a) content of one or more other multimedia files stored on the client device; (b) a type of the client device; and (c) a user-specified relevance of the client device.

3. The method of claim 1, wherein the one or more relevance factors comprise a degree of confidence that a given keyword describes the one or more features that were correlated with that keyword.

4. The method of claim 1, wherein transmitting the structure-searchable data to the indexing server further comprises transmitting data usable by the indexing server to identify a group of devices to which the client device has been registered.

5. The method of claim 1, further comprising: transmitting the multimedia file in response to receiving a request from the indexing server.

6. A client device for indexing content of a multimedia file, the client device comprising:
a computer processor;
a memory coupled to the processor and storing program instructions executable by the processor to implement:
segmenting the content of the multimedia file into a plurality of segments;
determining structure-searchable data for each segment, wherein the determining comprises:
identifying one or more features of respective multimedia types in the segment;
correlating each of the identified features to one or more respective keywords; and
calculating one or more respective relevance factors for each of the keywords, wherein at least one of the relevance factors is based on one or more characteristics of the client device; and
transmitting the structure-searchable data to an indexing server, wherein the structure-searchable data includes the keywords, and further includes, for each included keyword, a corresponding relevance value and information identifying at least one media type of a feature with which the keyword is correlated, wherein for at least one keyword included in the structure-searchable data, the structure-searchable data comprises first media type information indicating that the keyword is associated with a first media type and second media type information indicating that the keyword is also associated with a second media type that is different than the first media type.

7. The client device of claim 6, wherein the calculating of the at least one of the relevance factors is based on: (a) content of one or more other multimedia files stored on the client device; (b) a type of the client device; and (c) a user-specified relevance of the client device.

8. The client device of claim 6, wherein the one or more relevance factors comprise a degree of confidence that a given keyword describes the one or more features that were correlated with that keyword.

9. The client device of claim 6, wherein transmitting the structure-searchable data to the indexing server further comprises transmitting data usable by the indexing server to identify a group of devices to which the client device has been registered.

10. The client device of claim 6, wherein the program instructions are further executable to implement: transmitting the multimedia file in response to receiving a request from the indexing server.

11. A method for creating a content index of multimedia content, the method comprising:
receiving, by an indexing server, structure-searchable data from a plurality of remote client devices, wherein the structure-searchable data describes content of multimedia files stored on the remote client devices; and
for each of the client devices, the indexing server performing:
identifying a respective client device group to which the client device has been registered, wherein the identified client device group is associated with a content index for the client device group, and
updating the content index for the client device group to which the client device has been registered using the structure-searchable data received from the client device, wherein the updating is dependent on a weighting scheme specific to the client device group.

12. The method of claim 11, wherein at least one of a plurality of entries of the content index identifies a file having different multimedia-types, the method further comprising calculating a relevance factor the at least one entry based on respective different weights associated with the different multimedia-types.

13. The method of claim 11, wherein the updating is further dependent on one or more relevance factors received in the structure-searchable data, wherein at least one of the relevance factors is based on: (1) one or more characteristics of the client device, or (2) a measure of confidence that a given keyword describes one or more features correlated with that keyword in the structure searchable data.

14. The method of claim 13, wherein the one or more characteristics of the client device that the updating of the content index is dependent upon corresponds to at least one of: (a) content of one or more other multimedia files stored on the client device; (b) a type of the client device; and (c) a user-specified weight for the client device.

15. The method of claim 11, further comprising:
determining, by the indexing server in response to receiving a content query from one of the remote client devices, that the remote client device is a member of a client device group;

determining, by the indexing server, a content index corresponding to the client device group; and using, by the indexing server, the determined content index to identify one or more portions of the content responsive to the content query.

16. An indexing server for indexing content of a multimedia file, the indexing server comprising:
a computer processor; and
a memory coupled to the processor and storing program instructions executable by the processor to implement:
receiving structure-searchable data from a plurality of client devices, wherein the structure-searchable data describes content of multimedia files stored on the client devices; and
for each of the client devices:
identifying a respective client device group to which the client device has been registered, and
updating a content index of the client device group using the structure-searchable data received from the client device, wherein the updating is dependent on a weighting scheme specific to the client device group.

17. The indexing server of claim 16, wherein at least one of a plurality of entries of the index identifies a file having different multimedia types, the memory and the processor further configured to calculate a relevance factor for the at least one entry based on respective different weights associated with the different multimedia-types.

18. The indexing server of claim 16, wherein the updating is further dependent on one or more relevance factors received in the structure-searchable data, wherein at least one of the relevance factors is based on: (1) one or more characteristics of the client device, or (2) a measure of confidence that a given keyword describes one or more features correlated with that keyword in the structure searchable data.

19. The indexing server of claim 18, wherein the one or more characteristics of the client device that the updating of the client index is dependent upon corresponds to at least one of: (a) content of one or more other multimedia files stored on the client device; (b) a type of the client device; and (c) a user-specified weight for the client device.

20. The indexing server of claim 16, wherein the program instructions are further executable to implement:
determining, in response to receiving a content query from one of the client devices, that the client device is a member of a client device group;
determining a content index corresponding to the client device group; and
using the determined content index to identify one or more portions of the content responsive to the query.

21. The method of claim 1, wherein the one or more characteristics of the client device comprise a type of the client device.

22. The method of claim 1, wherein the one or more characteristics of the client device comprise a user-specified relevance of the client device.

23. The method of claim 1, wherein the one or more relevance factors include a prominence score indicating how prominently one of the one or more features is presented in the segment.

24. The method of claim 1, wherein the one or more relevance factors include an indication of whether the keyword is associated with an image, text, voice, or sound.

25. The method of claim 1, wherein calculating the one or more respective relevance factors for each of the keywords comprises using a first weight if the device type is a first type of client device and using a second weight that is higher than the first weight if the device type is a second type of client device.

26. The method of claim 2, wherein calculating the one or more respective relevance factors for each of the keywords comprises determining a weight to apply to the client device based on how frequently the keyword is associated with other content on the client device.

27. The method of claim 12, wherein updating the content index comprises calculating a relevance score for a multimedia segment stored on one of the remote client devices as a sum of two or more weights applied to the multimedia segment.

28. The method of claim 12, wherein the structure-searchable data identifies a keyword associated with a segment of the multimedia file and identifies the segment as having a first media type and a second media type, the method further comprising calculating a relevance factor for the segment by adding a first weight assigned to the first media type and a second weight assigned to the second media type.

29. The method of claim 28, wherein the determined relevance factor is an initial relevance factor, and wherein updating the index comprises determining an updated relevance factor based on the formula (initialScore+Prom)*WRel*WFact*WQual, wherein the initialScore is the initial relevance score, Prom is a prominence score indicating a degree of prominence in which features associated with the keyword is present in the segment, WRel is a confidence interval that indicates a confidence with which the keyword is associated with features of the segment, WFact is a device-specific weight that indicates how much the keyword is represented in the segment, and WQual is a quality factor indicating media quality of the segment.

30. The method of claim 11, wherein at least one of the updated content indices comprises:
a first record linking a first key word with a first segment of a multimedia file and with a first score; and
a second record that links said first key word with a second segment of the multimedia file and with second score, wherein
the second segment of the media file is different than the first segment.

31. The method of claim 11, wherein the weighting scheme specific to the client device group identifies a first weight for a first media type and a second weight for a second media type that is different than the first media type.

32. The method of claim 1, wherein transmitting the structure-searchable data (SSD) comprises transmitting a set of records comprising the SSD, wherein at least one of the records included in the set of records comprises: a file identifier identifying the multimedia file, a device identifier identifying the client device, a segment identifier identifying one of the plurality of segments, a keyword, media type information identifying each media type with which the keyword is associated, and a keyword score.

33. The method of claim 1, wherein
transmitting the structure-searchable data (SSD) comprises transmitting a set of records comprising the SSD,
at least one of the records included in the set of records comprises: 1) a segment identifier identifying one of the plurality of segments, 2) a keyword, media type information identifying each media type with which the keyword is associated, and 3) a plurality of relevance factors for use in determining a final relevance score for the keyword included in the record, the plurality of relevance factors including a first relevance factor, a second relevance factor, and a third relevance factor, and the method further comprising using said first, second and third relevance factors to determine the final relevance score.

34. The method of claim 33, wherein the first relevance factor is a prominence score, the second relevance factor is a confidence interval that indicates a confidence with which the keyword in the record is associated with one or more features included in the segment identified in the record, and a device-specific weight.

* * * * *